United States Patent [19]
Macovski

[11] 3,786,180
[45] Jan. 15, 1974

[54] FOURIER TRANSFORMING SYSTEM

[75] Inventor: Albert Macovski, Palo Alto, Calif.

[73] Assignee: Stanford Research Institute, Menlo Park, Calif.

[22] Filed: July 31, 1972

[21] Appl. No.: 276,710

[52] U.S. Cl. .............................................. 178/6.5
[51] Int. Cl. ......................... H04n 9/54, H04n 9/60
[58] Field of Search.................. 178/7.6, 7.3 D, 6.5, 178/5.4 ES, 6.8, DIG. 27, 6.7 R, 6.7 A; 250/199

[56] References Cited
UNITED STATES PATENTS
3,643,017  2/1972  Pekau .................................. 178/6.5

*Primary Examiner*—Robert L. Griffin
*Assistant Examiner*—Fay I. Konzem
*Attorney*—Urban Faubion et al.

[57] ABSTRACT

A Fourier transform of a two-dimensional scene may be made by viewing that scene with a television camera. The output of the scene modulates a source of coherent light, which is then divided into two light beams. One beam of coherent light is deflected by a light deflection system synchronously with the television camera, so that its angle of impingement on an integrating plane is varied accordingly. The undeflected light beam is also directed at the integrating plane where both light beams are integrated by either a photographic film or another television camera and thereby forms a Fourier transform of the scene. The film records the magnitude of the Fourier transform while the second television camera provides electrical signals representative thereof.

13 Claims, 3 Drawing Figures

FOURIER TRANSFORMING SYSTEM

BACKGROUND OF THE INVENTION

This invention is related to systems for forming Fourier transforms of an incoherently illuminated scene, and more particularly, to improvements therein.

Currently some types of optical data processing are being done on pictorial material by first taking a Fourier transform of an input transparency through the use of a digital computer. This is a non-real-time system since the number of computations required for the transforming operation is staggeringly high.

OBJECTS AND SUMMARY OF THE INVENTION

An object of this invention is to provide a system for generating a Fourier transform in real time.

Another object of this invention is the provision of a system which can make a hologram directly from an electrical signal.

Yet another object of the invention is the provision of a novel, and useful system for producing a Fourier transform.

These and other objects of the invention are achieved in an arrangement wherein a scene, illuminated by a non-coherent light, is viewed by a television camera. In one embodiment of the invention, the output of a laser is amplitude modulated by the output of the television camera. The modulated laser beam is then split into two beams, one of which is angularly deflected synchronously with the television camera deflection signals. Both beams are then added together at a storage surface such as a film or a TV camera, to form a sinusoidal grating pattern, corresponding to the Fourier transform of each point in the input image.

In another embodiment of the invention, the output of the laser is split into two beams and thereafter only one of the beams is amplitude modulated by the output of the camera while the other beam is angularly deflected in synchronism with the camera scanning beam. These are added together at a storage surface in the same manner as has been described previously.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
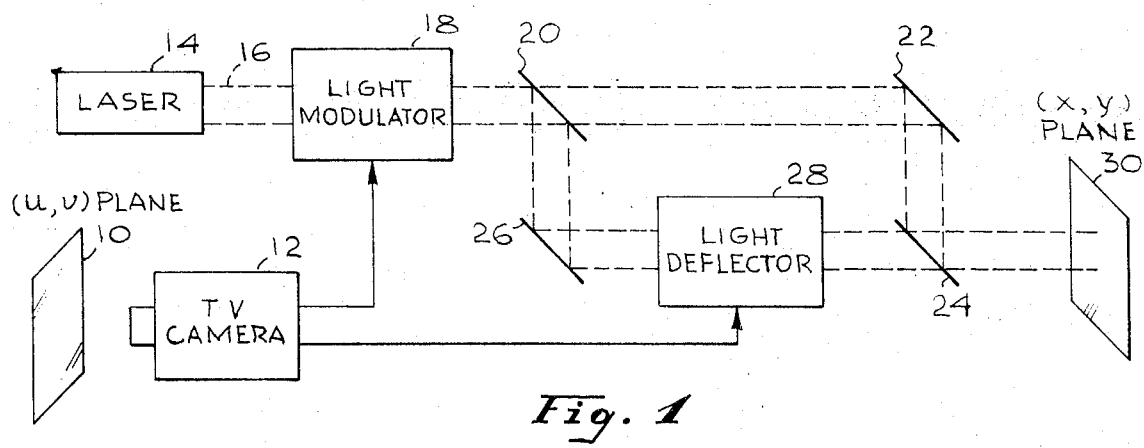
FIG. 1 is a schematic drawing of one embodiment of the invention.

A scene, such as a transparency 10, is illuminated by non-coherent light. This is viewed by a TV camera 12. A coherent light source such as a laser 14 produces a light beam 16. A light modulator 18, such as a Kerr cell, is used to amplitude modulate this light beam in response to the amplitude modulated output of the TV camera 12.

The output of the light modulator 18 is applied to a half-silvered mirror 20, which divides the light beam into two parts. One of these parts passes directly through the mirror and is reflected by a second mirror 22 downward onto another half-silvered mirror 24. The second part of the light beam created by the mirror 20 is reflected down to a mirror 26. The mirror 26 reflects the second light beam onto a light deflector 28, which, in response to the same deflection signals which are used to deflect the scanning beam in the television camera 12, angularly deflects the second light beam relative to the first light beam. The second light beam then passes through the half-silvered mirror 24, and thence onto a film 30 which alternatively may be a vidicon camera, if electrical signals are desired. The light beam, which is reflected from the mirror 22, onto the mirror 24, is reflected from there onto the surface of the film 30.

Thus, the surface of the film 30 will have stationary or a reference illumination comprising amplitude modulated light and superimposed thereon amplitude modulated and angle deflected light. The light deflector 28 operates to change the angle at which the second light beam is added to, or interferes with the first light beam, in response to the horizontal and vertical deflecting signals which are applied to the light deflector 28. To further clarify this, the first and second light beams derived from the laser are not pin point beams, but each comprises an area of light sufficient to illuminate the entire film 30 or the target of a TV camera. They are superimposed over one another with the angle of impingement of one on the other being varied as described. The light deflector may be any of the well known electro-optic means for deflecting a light beam at television scanning frequencies. One is illustrated in U.S. Pat. No. 3,514,181, for example. The motion required of the light beam at the film 30 is not very large, since only a small angular change is required. Thus, the light deflector may also be a mirror, such as mirror 26 which moves angularly about an axis which passes through the center of the light beam which impinges thereon. If a film is employed to add the two light beams, the result is a Fourier transform hologram. If a storage type television camera is employed, such as a vidicon or orthicon, the result is an electrical signal which can be stored in any desired manner, such as on tape, for subsequent reconstruction.

The light beams are added together at the storage surface to form a sinusoidal grating pattern corresponding to the Fourier transform of each point in the input image $a(u,v)$. The instantaneous field amplitude of the output plane $V_i(x,y)$ due to the points $u_i, v_i$ is given by:

$$V_i(x, y) = a(u_i \cdot v_i) + a(u_i \cdot v_i) e^{jk[\alpha u_i x + \beta v_i y]} \quad (1)$$

The integrated output intensity $I(x,y)$, is given by:

$$I = \int\int |V(x,y)|^2 du\,dv = K + F[a^2(u,v)] + F^*[a^2(u,v)] \quad (2)$$

where:

$K = \int\int 2a^2 du\,dv$, $F$ is the Fourier transform operator, $F^*$ is its conjugate, $\alpha$ and $\beta$ represent the proportionality factors of angular deflection, and $u$ and $v$ the scanning position.

Thus, $\alpha_u = \sin \theta_x$, where $\theta_x$ is the angle made with $x$ axis by the light deflector and $\beta_v = \sin \theta_y$.

Thus, the resultant pattern is a constant term $K +$ the sum of the Fourier transform and its complex conjugate. Alternatively, this can be expressed as twice the real part of the Fourier transforms or the Fourier transform of the real object $a(x,y)$ plus the reversed object $a(-x,-y)$. Thus, for the case of symmetrical objects, the Fourier transform is directly useable. For general objects, however, a method is needed to separate the transform from its conjugate. One method involves two complete scans. A first scan, as shown, provides a constant, plus the real part of the Fourier transform. In a second scan, the reference wave is shifted by 90° such that the instantaneous field amplitude, $V_i$, becomes:

$$V_i = e^{j\pi/2} + a(u_i \cdot v_i) e^{jk[\alpha u_i x + \beta v_i y]} \quad (3)$$

Shifting of the reference wave by 90° can be achieved by translating mirror 22 $\lambda/4$ along the axis of the light beam which impinges thereon or switching the voltage on an electro-optic crystal, such as KDP, in the path of the reference beam.

The resultant integrated intensity becomes $$I = K + j[F(a) - F^*(a)] \quad (4)$$
$$= K - 2 \, Im \, F[a(u,v)] \quad (5)$$

Thus, the combination of the two scans provides a complete Fourier transform including the real and imaginary parts. These can be stored on a video disc to be combined or subsequently processed. It if is desired to combine the two components on a single transparency, the two storage signals can each be multiplied by quadrature carrier signals and applied to a display device which is photographed. The resulting signals have the form:

$$Re \, F(a) \cos wx + In \, F(a) \sin wx$$
$$= e^{-jwx} F(a) + e^{jwx} F^*(a) \quad (6)$$

Thus, the Fourier transform and its conjugate are placed on a spatial frequency carrier where they can be optically separated.

Another and simpler method of separating the transform from its conjugate involves offsetting the deflected beam. Rather than angularly deflecting the beam symmetrically about its axis from a negative to a positive value, it is offset in one dimension. For example, it may be offset in the $x$ dimension in an amount such that the entire angular swing is of one polarity. This may be done by deflecting about an axis which is at an edge of the beam, instead of in the center. Consider offsetting the $x$ axis deflector in an amount say to $\theta_o$, where $\gamma = \theta_o$. The value of $\gamma$ would have to at least be equal to $\alpha_u$ max, where $u$ max is half the width of the original object. The instantaneous amplitude $V_i$ then becomes:

$$u_i = 1 + a_i e^{jk\gamma x_o} e^{jk[\alpha u_i x + \beta v_i y]} \quad (7)$$

The first integrated intensity is then $$I = K + F^*[a(u,v)] e^{jk\gamma x} + F[a(u,v)] e^{-jk\gamma x} \quad (8)$$

thus, placing the transform and its conjugate on a spatial frequency carrier. The inverse transform of this pattern $a(u,v)$ and $a(-u,-v)$ will be translated in opposite directions an amount proportional to $\gamma$. This method has the advantage of being generated in a single scan. It has the disadvantage of requiring additional resolution in one dimension of the video, as compared to the previous system which required two scans.

Figure 2:
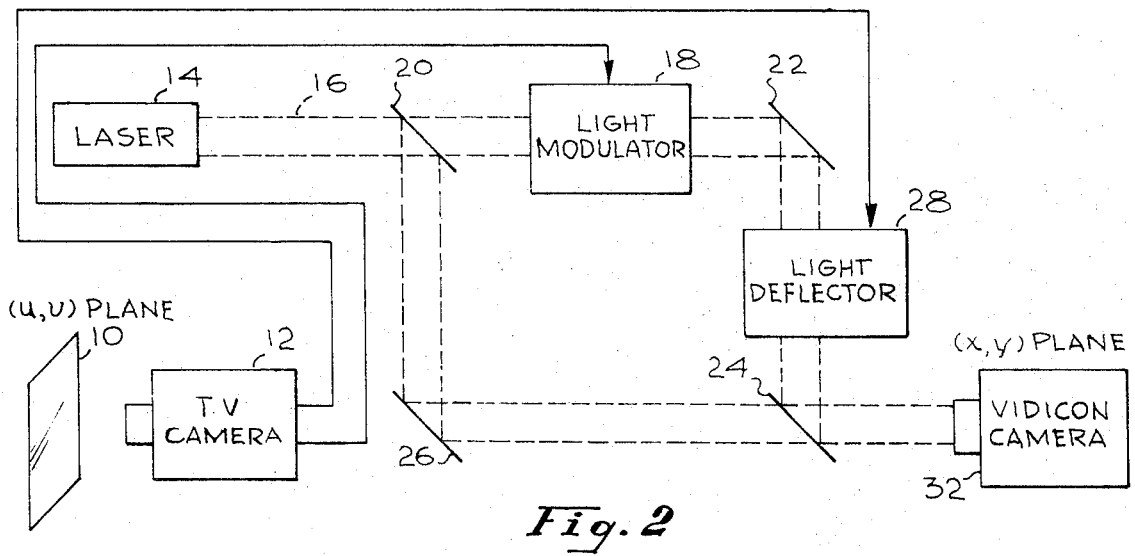
FIG. 2 is a schematic drawing of a second embodiment of the invention.

FIG. 2 is a schematic drawing of a second embodiment of the invention. FIG. 2 differs from FIG. 1 in the placement of the light modulator 18 and light deflector 28 in a manner so that only one of the two beams formed from the signal laser beam is amplitude modulated by the output of the television camera 12, with the other beam acting as a reference light beam. The result is the same, that is a Fourier transform of the scene 10 is established at the $(x,y)$ plane. In FIG. 2, a vidicon camera 32 is represented in place of the film 30, although the film may be used if a hologram is desired. Structures in FIG. 2 which are similar to structures in FIG. 1 are given the same reference numerals.

In the systems shown in FIGS. 1 and 2, the continuously varying grating patterns for generating Fourier transforms are supplied by the interference of a scanned laser beam and a reference beam. Actually, any method of continuously varying the horizontal and vertical spatial frequency of a sinusoidal grating pattern and then integrating the two will provide the desired transform.

If the scanned laser uses mechanical mirror deflection systems for horizontal and vertical axes, the horizontal deflection may be difficult because of the relatively high speed required. Electro-optic and acoustic methods may be used for rapid horizontal deflection. If acoustical deflection systems are used, such as a Bragg cell, with a variable frequency drive signal, the optical frequency is translated by the acoustic drive frequency. As such the deflected signal will not properly interfere with the reference wave. To avoid this problem, the deflected wave itself may be made to interfere with itself at a changing angle, and thus cause the desired variable sinusoidal grating pattern. An arrangement for accomplishing this is shown in FIG. 3.

Figure 3:
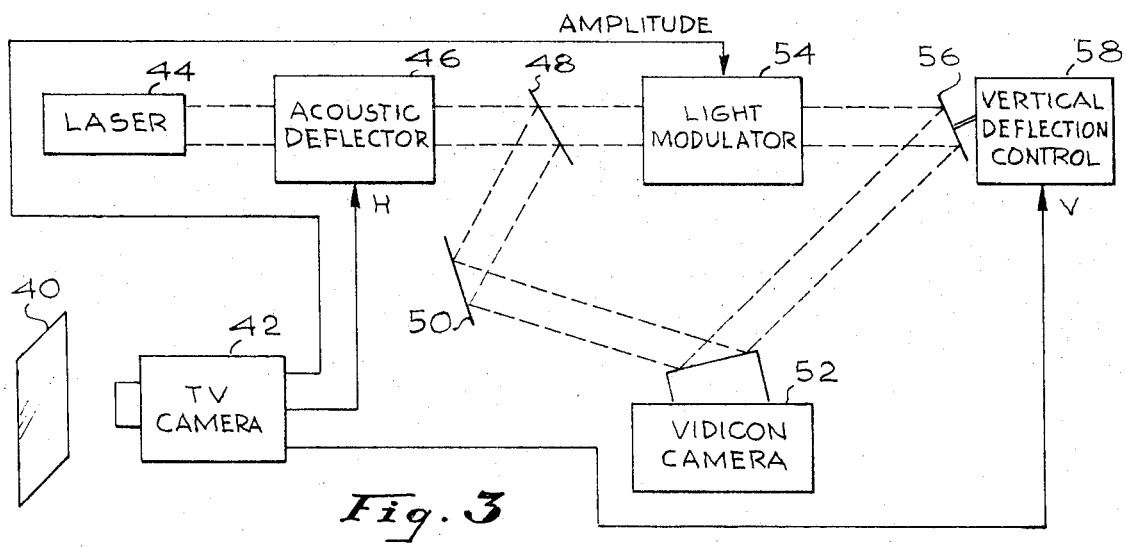
FIG. 3 is a schematic drawing of a modification of the arrangement shown in FIG. 2.

In FIG. 3, a non-coherently illuminated scene 40 is viewed by a TV camera 42. A coherent light source 44, such as a laser provides a light beam which is deflected synchronously by an acoustic deflector 46 in a horizontal mode in response to horizontal deflection signals from the TV camera 42. The light output of the acoustic deflector is applied to a half-silvered mirror 48, which splits the light beam into two parts. One part is reflected onto a mirror 50, which reflects the beam onto the viewing lens of a vidicon camera 52.

The second half of the light beam, which passes through the half-silvered mirror 48, is amplitude modulated by a light modulator 54 in response to signals from the TV camera 42. The output from the light modulator strikes a mirror 56, which deflects it onto the viewing lens of the vidicon camera 52. The mirror 56 can be a galvanometer mirror which is deflected by the usual galvanometer mirror deflection arrangement, here designated as vertical deflection control 58, in response to vertical deflection signals from camera 42.

In the arrangement shown in FIG. 3, the angle of intersection of the two light beams on the vidicon faceplate is varied as a result of and in synchronism with the deflection signals of the TV camera.

There has accordingly been described and shown herein a novel and useful arrangement for creating a Fourier transform hologram or electrical signals representative thereof in real time and relatively inexpensive.

What is claimed is:
1. The method of obtaining a Fourier transform of a scene, comprising:
viewing said scene with a television camera,
generating a first and second coherent light beam,
deriving from said television camera amplitude modulated signals generated by viewing said scene, deriving from said television camera scanning deflection signals used by said camera in viewing said scene, amplitude modulating at least one of said first and second coherent light beams in response to said camera amplitude modulated signals to provide an amplitude modulated light beam, angularly deflecting at least one of said first and second coherent light beams in response to said camera deflection signals to produce a deflected light beam, and directing all of said light beams at the same area of a plane to interfere with each other, where at the Fourier transform of said scene is produced.

2. The method as recited in claim 1 including the step of integrating said light beams at the area of said plane.

3. The method as recited in claim 1 wherein both said first and second light beams are amplitude modulated in response to said camera amplitude modulated signals.

4. The method as recited in claim 1 wherein both said first and second light beams are deflected in response to said camera deflection signals.

5. The method as recited in claim 1 including recording at said plane the results of a first complete scan of said scene by said television camera, shifting the phase angle of said undeflected one of said two light beams ninety degrees relative to to the phase angle it had during the interval of the first complete scan of said scene, recording at said plane the results of a second complete scan of said scene by said television camera, optically reproducing said two recordings, and superimposing said two optical recordings on one another.

6. The method as recited in claim 1 wherein said step of angularly deflecting comprises angularly deflecting about an axis located at the center of the light beam.

7. The method as recited in claim 1 wherein said step of angularly deflecting comprises angularly deflecting about an axis located at one edge of the light beam.

8. Apparatus for obtaining a Fourier transform of a scene comprising:

television camera means for scanning said scene and generating horizontal and vertical deflection signals and amplitude modulated signals representative of said scene, laser means for generating a first and second coherent light beam, means for amplitude modulating at least one of said coherent light beams with said amplitude modulated signals to produce an amplitude modulated light beam, means for angularly deflecting at least one of said coherent light beams with said deflecting signals to produce a deflected light beam, and means for directing all of said light beams at the same area of a plane to interfere with each other and produce a Fourier transform of said scene.

9. Apparatus as recited in claim 8 including means at said plane for integrating the light beams directly thereat.

10. Apparatus as recited in claim 8 wherein both said first and second light beams are amplitude modulated by said means for amplitude modulating.

11. Apparatus as recited in claim 8 wherein both said first and second light beams are deflected by said means for deflecting.

12. Apparatus as recited in claim 8 wherein said means for angularly deflecting deflects at least one of said coherent light beams about an axis located at the center of said one of said light beams.

13. Apparatus as recited in claim 8 wherein said means for angularly deflecting deflects at least one of said coherent light beams about an axis located at one edge of said one of said light beams.

* * * * *